Jan. 17, 1967  A. LANGE ETAL  3,298,825
PROCESS AND FURNACE FOR SEPARATING VOLATILE
FROM NON-VOLATILE MATERIAL
Original Filed June 6, 1958
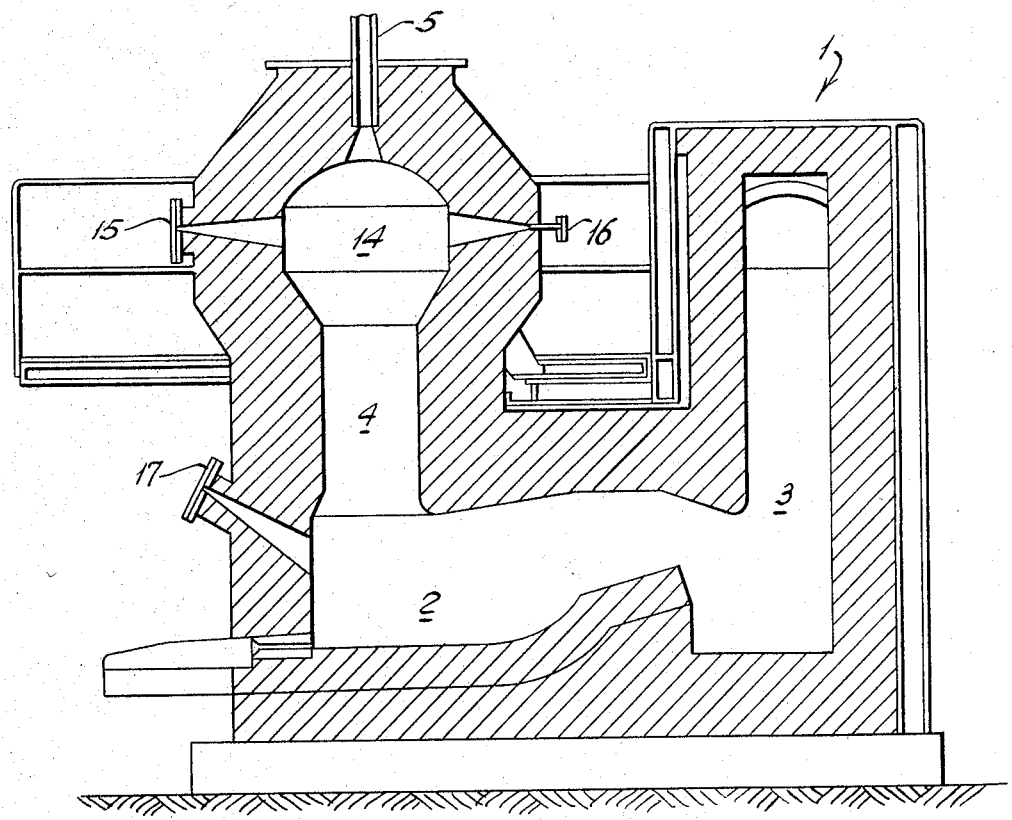
INVENTORS
ALFRED LANGE
JOACHIM BARTHEL

# United States Patent Office 3,298,825
Patented Jan. 17, 1967

3,298,825
PROCESS AND FURNACE FOR SEPARATING VOLATILE FROM NON-VOLATILE MATERIAL
Alfred Lange and Joachim Barthel, Freiberg, Germany, assignors to Veb Mansfeld-Kombinat Wilhelm Pieck, Eisleben, Germany
Continuation of application Ser. No. 740,419, June 6, 1958. This application July 15, 1963, Ser. No. 295,115
5 Claims. (Cl. 75—63)

This application is a continuation of application Serial No. 740,419, filed June 6, 1958 and now abandoned.

This invention relates to a process and to apparatus for separating volatile metals, metal compounds and the like at high temperature from a raw material containing said metals or compounds while the raw material is suspended in a gaseous phase.

Volatilization of metals and their compounds at a practical rate frequently requires high temperatures which cannot always be reached for reasons of economy. It is, however, possible to operate at relatively low temperatures if a gas is made to pass at high relative velocity over the surface of the volatile material or if a highly volatile compound is formed by reaction of a relatively non-volatile metal or compound with the gas or a compound suspended therein.

It has been proposed to blow a stream of pulverized raw material together with a stream of gas into a reaction vessel where the volatile components are removed and carried off by the flowing gas. In order to maintain the necessary relative velocity of gas and suspended solid, and to keep the solid particles in suspension, a high degree of turbulence both in the direction of flow and at right angles to it is required. The arrangement above described, however, either leads to rapid sedimentation and premature removal of the solid particles from the stream of gas, or to entrainment of the solid by the gas whereby the relative velocity of gas and solid drops below the effective minimum value and the solid is carried out of the high temperature zone of the reaction vessel before the reaction of volatilization can be advanced to a satisfactory degree.

It is an object of the present invention to provide a method for virtually complete separation of volatile components from a raw material comprising volatile metals, metal compounds, and the like.

It is another object of the invention to provide effective control means permitting to adjust the process conditions over a practical range.

It is still another object of the invention to provide apparatus for performing the aforementioned process.

Other objects and features of this invention will become apparent to those versed in the art as the disclosure is made in the following detailed description of a preferred embodiment of the invention as illustrated in the accompanying drawing in which:

The only figure is a vertical sectional view of a preferred embodiment of the apparatus of the invention.

A reverberatory furnace generally shown at 1 and equipped with a hearth 2 which rises towards the flue 3 is provided with a vertical hollow shaft 4 located above the hearth 2. At the top of shaft 4 there is an opening 5 for admitting the charge into the upper portion 14 of shaft 4 which serves as a primary reaction chamber. Nozzles 15 and 16 permit fuel and air to be injected into the reaction chamber. An additional nozzle 17 located near the lower end of shaft 4 permits injection of material into the stream of exhaust gases from reaction chamber 14.

Briefly, the invention pertains to a process and apparatus for separation by volatilization of metals, metal compounds, and the like from their ores, concentrates and other intermediate products of extractive metallurgy, and other solid mixtures or compounds. The volatilized materials are carried out of the reaction or volatilization zone and driven off by the exhaust gases from which they are separated by well known methods, whereas slag and other non-volatile components of the raw material are collected in a receptacle outside the primary reaction zone and are withdrawn in the molten or solid state.

Referring to the drawing which illustrates a preferred embodiment of apparatus for performing the process of the invention, the charge of raw material which may contain or may be pre-mixed with the fuel and slag-forming additions is admitted through the opening 5 at the top of the shaft whereby the solid material is carried into the primary reaction chamber 14 by gravity in a vertical direction or flow. Fuel and air of combustion are injected into the reaction chamber 14 through nozzles 15 and 16 respectively. A zone of high temperature forms in chamber 14 by their combustion, the temperature being above the temperature of volatilization required. We prefer to arrange paired fuel and air nozzles on opposite walls and to inject air and fuel at high velocity thereby creating high turbulence in the reaction chamber. The injected streams of fuel and air are admitted in a direction substantially transverse to the direction of flow of the particles of raw material. If the streams of fuel and air enter in a radial transverse direction, turbulence is predominantly horizontal, whereas the contents of the reaction chamber 14 can be made to spin about the axis of shaft 4 by tangential transverse injection of fuel and air. The turbulence created by the design of the invention causes the charge to remain in suspension for a period sufficient to complete reaction or volatilization within the reaction chamber.

While the shaft and its chamber portion have been described above as being heated by the combustion of the injected fuel in the furnace illustrated, it is apparent that other sources of high temperature may be utilized or that the heat of reaction of the charge with air or other gases, capable of reacting with the volatile components thereof, may be sufficient to maintain the desired temperature. The height, diameter, and shape of the shaft may also be modified substantially to suit the properties of a specific raw material. Where the high temperature of the reaction chamber is achieved by means other than combustion with air, suitable inert gases are introduced through nozzles 15 and 16 to create turbulence.

The rate of reaction, the flow rate of the reaction gases, and their composition can be controlled by varying the degree of comminution of the charge, and the amount, proportions and composition of the fuel and combustion air.

Furthermore, an inert gas, a gas capable of reacting with the volatile components, secondary combustion air, or a mixture of these gases may be introduced into a secondary reaction zone near the lower part of the shaft through nozzle 17.

While a gaseous or liquid fuel containing a relatively high percentage of hydrogen or hydrocarbon is usually preferred, other gaseous, liquid or solid fuels may be injected through nozzles 15 and 16 in order to achieve a specific reaction atmosphere. The combustion equilibrium and thereby the rate of reaction may further be influenced by introducing steam, carbon dioxide or both into reaction chamber 14 or into the path of the exhaust gases outside the reaction chamber through nozzles such as 17 located in the shaft or near the hearth. The rate of gas flow in any part of the furnace may be increased by introducing inert gases which may act as diluents when fed to the reaction zone. Secondary air of combustion and other reactive gases may be injected through nozzle 17. We further contemplate operation with an excess of air over that required for combustion of the fuel whereby oxidation of volatile compounds or formation of volatile oxidation products from non-volatile material may be achieved. Such modifications and others not specifically enumerated will readily present themselves to those skilled in extractive metallurgy and in other chemical and related arts to which our process and apparatus may be applied.

The hearth 2 rises towards the flue 3 so that entrained liquid droplets of non-volatile material may be deposited and drain back into the hearth. We prefer to equip the furnace with mechanical means for collecting fly-dust such as a dust chamber in the flue.

We have found that volatile compounds such as zinc sulfide can be practically completely removed from ores and similar materials at temperatures between 1,000 and 1,600° C. The process of the invention is particularly applicable to ores containing organic combustible material such as for example bitumen, oil or carbon.

We have also found that concentrates of sulfidic ores such as ferruginous zinc blende can be processed by our method under oxidizing conditions so that the volatile sulfides, especially those of zinc and lead are volatilized and oxidized and can be recovered from the flue gases, whereas the non-volatile sulfides such as those of copper and iron together with the noble metals collect in a matte which can be withdrawn from the hearth together with the slag. It is apparent that the process can be modified to yield metal from the matte by the roast-reduction process.

The results achieved by the method of the invention in equipment of the type shown in the drawing are illustrated by two representative examples.

*Example 1*

A charge of 1100 lbs. of a lean ore containing 2.9% zinc and 0.6% lead was comminuted to an average grain size of 0.3–0.4 mm. and was processed at a temperature of 1,200° C. The slag which collected in the hearth weighed 787 lbs. and contained 0.82% zinc and 0.06% lead, indicating that 80% of the zinc and 93% of the lead present in the charge had been volatilized. The fly-dust recovered contained 43.8% zinc, 17.7% lead and 3.0% silica.

*Example 2*

3,640 lbs. of a 10:1 mixture of zinc blende concentrate and lean ore having an average composition of 41.8% zinc and 0.96% lead were pulverized and processed at 1,200° C.

904 lbs. of slag containing 6.77% zinc and 0.06% lead were obtained. 96% of the zinc originally present and 99% of the lead had been volatilized. The fly-dust contained 60.8% zinc, 2.7% lead, 1.0% silica, and 1.8% iron. The matte contained 56.6% copper, 5.9% zinc, 0.1% lead and 6.4% iron.

While we have described our method and special apparatus for its performance in their application to the recovery of volatile sulfides from a mixed sulfidic raw material, it is understood that this disclosure is for the purpose of illustration, that the method and apparatus are equally applicable to the separation of non-volatile admixtures from volatile metal compounds not of a sulfidic nature, and generally from materials which are either volatile at elevated temperatures or can be transformed into volatile compounds by reaction with gases introduced into the reaction zone.

What we claim is:

1. A process for separating volatile and non-volatile components from raw material containing metal values comprising the steps of initially admitting said raw material in a finely divided form in a downward direction directly into the primary reaction zone of a furnace having a hearth situated beneath said reaction zone and extending rearwardly therefrom into communication with a flue which is situated to the rear of said hearth and extends upwardly therefrom, maintaining said reaction zone above the temperature of volatilization of said volatile components, suspending said raw material by injecting a stream of gas radially into said reaction zone in a direction substantially transverse to the direction of flow of said raw material at a velocity sufficient to create a turbulence in said reaction zone, maintaining said material in suspension until the volatile components thereof are substantially driven off by exhaust gases from said zone containing said gaseous volatile components, and exhausting them first in a downward direction from said reaction zone, then rearwardly over said hearth, so that entrained liquid droplets of non-volatile material will be deposited on said hearth, and finally out through said flue.

2. A process for separating volatile and non-volatile components according to claim 1, including the step of mixing the raw material with fuel prior to admitting said raw material into said primary reaction zone.

3. A process according to claim 1, including the step of introducing a secondary supply of gas into the downward flow of said volatile components and exhaust gases outside of said primary reaction zone.

4. A process as recited in claim 1 and wherein said raw material includes zinc and lead in comminuted form, and said gaseous volatile components including volatilized zinc and lead.

5. A process as recited in claim 1 and wherein said raw material includes a mixture of zinc blende concentrate and an ore which is pulverized and includes zinc and lead, said gaseous volatile components including volatilized zinc and lead.

References Cited by the Examiner

UNITED STATES PATENTS

| | | | |
|---|---|---|---|
| Re. 12,424 | 12/1905 | Brown | 75—26 |
| 156,243 | 10/1874 | Wheeler | 75—26 |
| 1,936,092 | 11/1933 | Kuzell | 75—86 |
| 1,949,905 | 3/1934 | Hall | 75—86 |
| 1,961,424 | 6/1934 | Maier | 75—86 |
| 2,128,379 | 8/1938 | Spencer | 75—1 |
| 2,184,300 | 12/1939 | Hodson et al. | 75—26 |
| 2,194,454 | 3/1940 | Greenawalt | 75—74 |
| 2,456,918 | 12/1948 | Church | 75—67 |
| 2,478,912 | 8/1949 | Garbo | 75—26 |
| 2,613,074 | 10/1952 | Woods | 266—15 |
| 2,636,817 | 4/1953 | Knechtel | 75—86 |
| 2,682,462 | 6/1954 | Woods | 75—86 |
| 2,951,756 | 9/1960 | Cavanagh | 75—40 |
| 3,065,958 | 11/1962 | Cerych et al. | 266—15 |

FOREIGN PATENTS 921,861   1/1947   France.

HYLAND BIZOT, *Primary Examiner.*

DAVID L. RECK, *Examiner.*

H. W. CUMMINGS, H. W. TARRING,
*Assistant Examiners.*